UNITED STATES PATENT OFFICE.

JACOB BUZBY, OF PHILADELPHIA, PENNSYLVANIA.

IMPROVEMENT IN PREVENTING AND REMOVING SCALE IN STEAM-BOILERS.

Specification forming part of Letters Patent No. 47,794, dated May 23, 1865.

*To all whom it may concern:*

Be it known that I, JACOB BUZBY, of Philadelphia, Pennsylvania, have invented an Improved Mode of Preventing Incrustation in Steam-Boilers; and I do hereby declare the following to be a full, clear, and exact description of the same.

My invention consists in an improvement on the invention for which Letters Patent were granted to me on the 11th day of April, 1865, in which I claimed the use for removing scale from steam-boilers of a preparation of gambier and the bark of the sweet-gum tree.

After a series of careful experiments with the above preparation and with various other substances, I have found that by the introduction into a steam-boiler of a solution of "gambier" alone the scale is quickly and effectually removed, and that by maintaining a quantity of the solution constantly in the boiler the formation of new scale is effectually prevented. The gambier is dissolved in a sufficient quantity of water, or is introduced in lumps or in a powder directly into the boiler, about twelve pounds of gambier being required for cleaning a boiler of the capacity used for driving a twenty-horse-power steam-engine.

I have found that a single application of this substance to a boiler of the size mentioned will in the course of twenty-four hours loosen the scale, so that it can be readily removed with the ordinary brushes.

I claim as my invention and desire to secure by Letters Patent—

The use of gambier for removing scale from steam-boilers, as described.

In testimony whereof I have signed my name to this specification in the presence of two subscribing witnesses.

JACOB BUZBY.

Witnesses:
CHARLES E. FOSTER,
JOHN WHITE.